(No Model.)
A. J. SMITH.
WIRE CONDUIT.
No. 425,913.　　　　　　　　Patented Apr. 15, 1890.
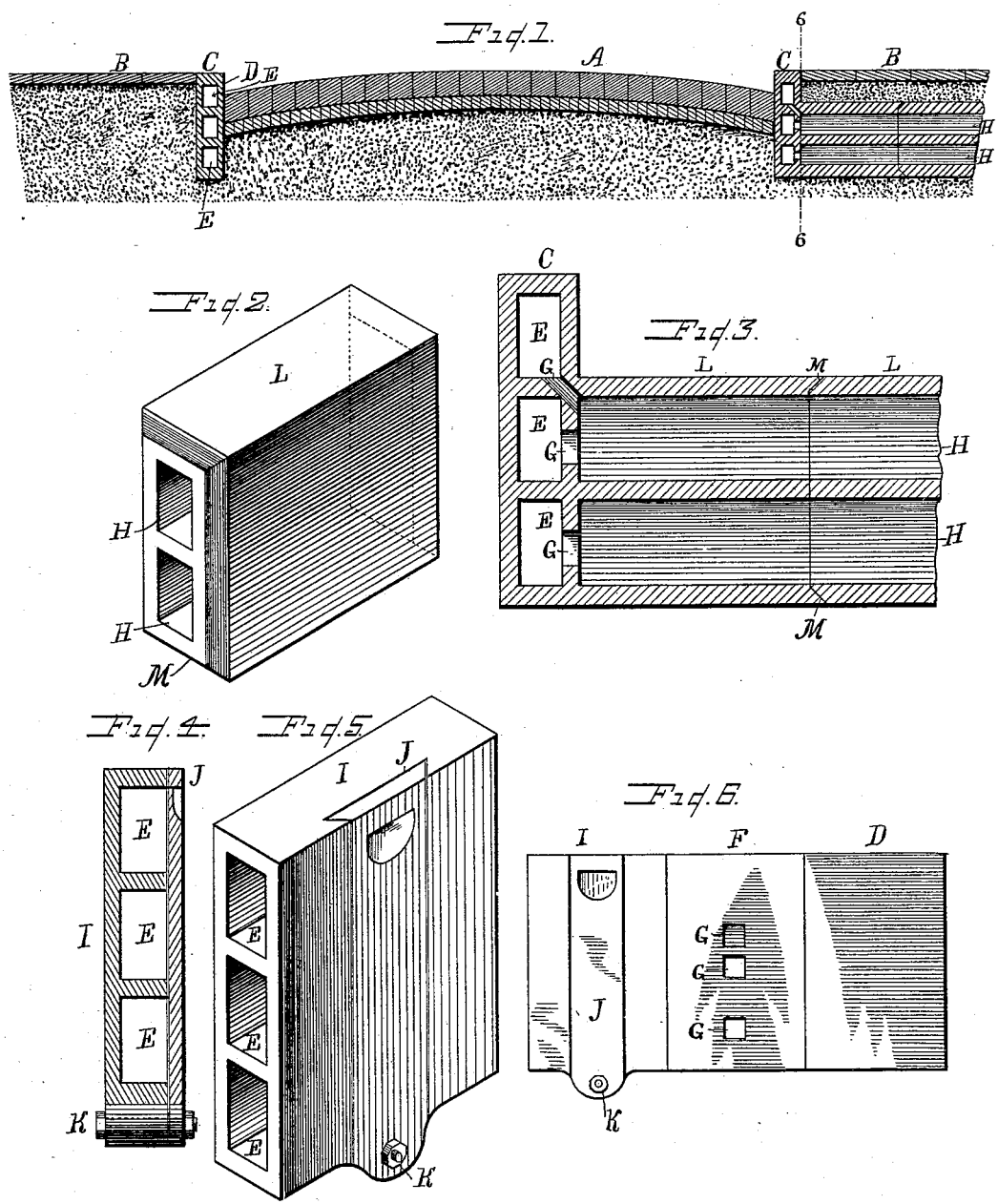
Witnesses:
R. A. Balderson
Emma Arthur
Inventor:
Andrew J. Smith.
By Knight Bros.
His Attorney

UNITED STATES PATENT OFFICE.

ANDREW J. SMITH, OF SOLDIERS' HOME, KANSAS.

WIRE-CONDUIT.

SPECIFICATION forming part of Letters Patent No. 425,913, dated April 15, 1890.

Application filed September 17, 1889. Serial No. 324,192. (No model.)

*To all whom it may concern:*

Be it known that I, ANDREW J. SMITH, of the Soldiers' Home, in the county of Leavenworth and State of Kansas, have invented certain new and useful Improvements in Curbstone and Electric-Wire Conduits, of which the following is a full, clear, and exact description, reference being had to the accompanying drawings, forming a part of this specification.

My invention relates to a curbstone and an improved device for conveying electric wires; and my invention consists in features of novelty hereinafter described, and pointed out in the claim.

Figure 1 is a transverse view of a paved street, showing my improved conduit. Fig. 2 is a perspective view of one of the beveled bricks out of which the branch conduit is formed. Fig. 3 is a sectional view of the main conduit which forms the curbing of the street and the branch conduit that leads off under the sidewalk, by which connection may be made with houses, lamp-posts, &c. Fig. 4 is a vertical section of one of the bricks, that are placed at certain distances from each other in the curbing, so that access may be obtained to the conduit when desired. Fig. 5 is a perspective view of the same. Fig. 6 is a section taken on line 6 6, Fig. 1, showing the different forms of brick out of which the curbing or main conduct is constructed.

Referring to the drawings, A represents the street-pavement, which may be constructed of any approved form.

B represents the sidewalk, which may also be constructed as may be desired.

C represents the curbing containing the main conduit, located between the street-pavement and sidewalk.

I utilize the curbing as a conduit for conveying electric or other wires in the manner hereinafter described.

In making the brick for the conduit I form them of suitable clay for making a hard-burned vitrified brick, and in the process of making the brick I form suitable holes in the same to form the conduit. In constructing the main conduit I use three different forms of brick, as shown in Fig. 6. The major portions of the bricks are made in the form shown at D, with no side openings, but which have the main conduit-holes, as represented by E. (See Fig. 1.)

F represents a brick having side openings G, which lead from the main conduit E to a branch conduit H. (See Fig. 3.) The bricks F are placed in the main conduit wherever it is desired to run a branch wire to a lamp-post, building, &c.

I represents a form of bricks that are placed at certain intervals in the conduit for convenience in gaining access to the wires. These bricks are provided with a sliding shutter J, which is dovetailed into the brick, and which is secured in its position by a bolt K.

The bricks F may be formed integral with a section L of the branch conduit, as shown in Fig. 3, or they may be formed separate, as may be desired. The bricks L of the branch conduit I prefer to form with beveled-end abutment connection, as shown at M, which will prevent them from becoming misplaced and at the same time form a tight connection.

At suitable points in the branch conduits I may have shutters similar to the shutter J, through which openings connections may be made and the shutter then closed and sealed in its position.

I may line my conduit with wood or metal, if desired. I may also, before laying the brick, dip them into boiling asphaltum, thus forming a coating over the entire brick and laying them in this hot condition make a perfectly-tight joint.

I claim as my invention—

An electric-wire conduit made of hollow bricks and formed into a street-curbing, certain of said bricks having a vertically-sliding removable shutter dovetailed into said bricks, whereby access may be had to the conduit, as herein set forth.

ANDREW J. SMITH.

Witnesses:
JOHN H. JOHNS,
M. H. FUSLEY.